US007697569B2

(12) United States Patent
Li et al.

(10) Patent No.: US 7,697,569 B2
(45) Date of Patent: Apr. 13, 2010

(54) MULTI-CODE-SET CHANNEL ESTIMATION METHOD IN A TIME-SLOT CDMA SYSTEM

(75) Inventors: Feng Li, Shanghai (CN); Yingmin Wang, Shanghai (CN); Nan Zhong, Shanghai (CN); Guiliang Yang, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 131 days.

(21) Appl. No.: 11/916,186

(22) PCT Filed: Jun. 2, 2006

(86) PCT No.: PCT/CN2006/001190

§ 371 (c)(1),
(2), (4) Date: Jun. 6, 2008

(87) PCT Pub. No.: WO2006/128385

PCT Pub. Date: Dec. 7, 2006

(65) Prior Publication Data

US 2008/0310455 A1    Dec. 18, 2008

(30) Foreign Application Priority Data

Jun. 3, 2005    (CN) .................... 2005 1 0075205

(51) Int. Cl.
*H04J 13/00*    (2006.01)
(52) U.S. Cl. .................. 370/479; 370/335; 370/321; 370/470; 375/148
(58) Field of Classification Search ............. 370/479, 370/470, 508, 320, 321, 458, 441, 335; 375/148, 375/134
See application file for complete search history.

(56) References Cited

U.S. PATENT DOCUMENTS

2005/0286613 A1* 12/2005 Wang et al. ................. 375/148

(Continued)

FOREIGN PATENT DOCUMENTS

CN    1520077    8/2004

(Continued)

OTHER PUBLICATIONS

International Search Report issued for PCT/CN2006/001190, dated Sep. 7, 2007; 6 pages.

*Primary Examiner*—Ricky Ngo
*Assistant Examiner*—Iqbal Zaidi
(74) *Attorney, Agent, or Firm*—Fulbright & Jaworski, L.L.P.

(57) ABSTRACT

A multi-code-set channel estimation method in a time-slot CDMA system having steps of: A. performing uni-code-set channel estimations and obtaining channel estimation result; B. extracting a maximum interference tap from the channel estimation result; C. reproducing interference components suffered respectively by response signals corresponding respectively to the plurality of code-sets from the maximum interference tap; D. canceling the interference components, and obtaining a pure channel estimation result of a signal corresponding to each code-set; E. determining whether a predetermined number of iterations has been performed, if so, outputting the result of each uni-code-set channel estimation; otherwise, taking the pure channel estimation result of the signal corresponding to each code-set as the channel estimation result of the code-set to be processed in the next iteration, and returning to step B. Due to the present invention, a multi-code-set joint channel estimation with high performance can be implemented simply and effectively.

15 Claims, 3 Drawing Sheets

U.S. PATENT DOCUMENTS

2008/0273511 A1* 11/2008 Wang et al. ................. 370/342
2008/0310455 A1* 12/2008 Li et al. ...................... 370/479

FOREIGN PATENT DOCUMENTS

| | | |
|---|---|---|
| CN | 1588931 | 3/2005 |
| EP | 0 952 711 A2 | 10/1999 |
| JP | 2002-33013 | 11/2002 |

* cited by examiner

MULTI-CODE-SET CHANNEL ESTIMATION METHOD IN A TIME-SLOT CDMA SYSTEM

CROSS REFERENCE TO THE RELATED APPLICATIONS

The present application claims priority of Chinese Patent Application No. 200510075205.7, titled "A MULTI-CODE-SET SIGNAL ESTIMATION METHOD IN TIME-SLOT CDMA SYSTEM" filed on Jun. 3, 2005, the entire disclosure of which is incorporated herein by reference; and the International PCT Application No.: PCT/CN2006/001190, titled "A MULTIPLE CODE-SET CHANNEL ESTIMATION METHOD IN TIME-SLOT CDMA SYSTEM" filed on Jun. 2, 2006, the entire disclosure of which is incorporated herein by reference.

FIELD OF THE INVENTION

The present invention relates to the field of mobile communication technology, and in particular to a multi-code-set channel estimation method in a time-slot CDMA (Code Division Multiple Access) system.

BACKGROUND OF THE INVENTION

The most remarkable characteristics of mobile communication are complicacy and time-dependency of channels. In a coherent reception scheme, it is necessary to estimate and measure a channel at the receiver side, and then coherent detection is implemented for a signal by means of the received channel response. In addition to its application in signal detection, the channel estimation also plays an important and basic role in relevant subsystems such as of physical layer measurement, intelligent antenna, fast control, switching, radio resource management, etc.

In a time-slot CDMA (Code Division Multiple Access) cellular mobile communication system, a channel estimation code and a data portion of a transmission are transmitted in a time multiplex manner and different cells are in time slot synchronization.

For example, in the TD-SCDMA (Time Division Synchronous CDMA, i.e., 3GPP 1.28 Mcps TDD) system, the structure of a burst signal in a service time slot is shown in FIG. 1.

In the middle of the burst signal, a midamble (also referred to as a channel estimation code) is provided to perform the channel estimation. The data blocks on both sides of the midamble are provided to transmit the service data.

The channel estimation code (midamble) described above is generated in the following ways.

For a same time slot of a cell, a basic midamble is given as a basic code, and different cyclic shift versions of the same basic code are taken by different users as his/her channel estimation code. K specific midambles $m_P^{(k)}$ ($k=1, \ldots, K$) deduced from one single basic code $m_P$ constitute a set of midambles, which may be referred to as a code-set for short.

In the TD-SCDMA system, the period of a basic code is P=128 and the length of a deduced midamble is Lm=128+6. What is used for channel estimation in the time-slot CDMA system is called a Steiner estimator. For detailed content, reference may be made to B. Steiner, and P. W. Baier, "*Low Cost Channel Estimation in the Uplink Receiver of CDMA Mobile Radio Systems*," FRE QUENZE, 47 (1993) 11-12. The specific estimation process is as follows:

It is assumed that the channel response of each user is $h^{(k)}$:

$$h^{(k)}=(h_1^{(k)},h_2^{(k)},\ldots,h_W^{(k)})^T \qquad (1)$$

Where the window length W is used to indicate the time length of the channel response and the channel response vector is represented by the values on W taps separated by chips. In this case, the length of a midamble response signal should be Lm+W−1. In view of successive transmission of the midamble and the transmitted data portion, the first W−1 values of the midamble response signal are affected by the preceding data block(s) and the last W−1 values are overlapped with the subsequent data block(s).

Taking P chips in the middle as observed values and the vector is expressed as:

$$e_{mid}=(e_1,e_2,\ldots,e_P) \qquad (2)$$

According to the characteristics of the generation, within one code-set, of the midambles of multiple users, the response signal to the midamble received by the receiver may be expressed as:

$$e_{mid}=Gh+n \qquad (3)$$

Where n indicates noise and interference, and h indicates the total channel response vector:

$$h=(h^{(1)T},h^{(2)T},\ldots,h^{(K)T})^T \qquad (4)$$

The matrix G is a cyclic matrix:

$$G=(circle(g_1,g_2,\ldots,g_P))^T \qquad (5)$$

Where $g=(g_1, g_2, \ldots, g_P)$ is the first column of the matrix C, determined by the basic code which generates the code-set.

The task of the channel estimation is to obtain an estimation value of the channel response h by solving the equation (3) with h as the unknown variable. The following can be obtained by using the maximum likelihood rule and implementing a simplification to some extent:

$$\hat{h}=G^{-1}e_{mid} \qquad (6)$$

Since the matrix G is a cyclic matrix, the actual operation may be implemented through 2-Dimension Discrete Fourier Transform (DFT) and Inverse 2-Dimension Discrete Fourier Transform (IDFT).

$$\hat{h} = IDFT\left(\frac{DFT(e_{mid})}{DFT(g)}\right) \qquad (7)$$

DFT(g) in the equation may be obtained by off-line calculation in advance.

By using this scheme of channel estimation, the channel estimation results of multiple users within a code-set are obtained with reduced calculation cost, and the interference among midambles of multiple users belonging to the same basic code is suppressed. This scheme of channel estimation aims to perform channel estimation with respect to the midambles of multiple users within a single code-set belonging to a single basic code, that is to say, the method is a uni-code-set channel estimation method.

In the uni-code-set channel estimation method, all the other signals, superposed at the same time, than the response to the signal corresponding to the concerned code-set, are treated as white Gaussian noises. Therefore, when the ratio of signal to interference and noise is low, the performance of the uni-code-set channel estimation method can not satisfy requirements. In addition, for a time-slot CDMA system with synchronously operating cells, the communication signals of the users in a neighbor cell who is located adjacent to the border between the neighbor cell and the concerned cell interfere greatly with the concerned cell, and the signals of a neighbor cell with the same frequency are in time slot synchronization with the signals of the concerned cell. That is to say, the interferences that the channel estimation code of the concerned cell suffers from neighbor cells having the same frequency mainly come from the responses to the channel estimation code signals in other code-sets synchronous with the concerned cell. In addition, in some other applications, it is also possible that the signals, with similar powers, responding to the channel estimation codes of multiple code-sets will overlap with each other. For example, when taking multiple antennas to perform reception, the performance of the uni-code-set channel estimation method is deteriorated in performance, thus not only limiting the improvement of the reception performance of the multi-antenna system, but also introducing performance deterioration in relevant subsystems of the multi-antenna system, such as subsystems of the forming transmission (beamforming transmission), physical layer measurement, synchronization and power control, etc. In this case, the uni-code-set channel estimation method is difficult to satisfy the requirements of the system with respect to the channel estimation performance.

Therefore, in Chinese Patent Application No. 03100670.1, a multi-code-set channel estimation method in a time-slot CDMA system is proposed. According to the method, a multi-code-set joint channel estimation is implemented based on a limited number of decisions of time positions.

In a practical multi-code-set channel estimation, on one hand the performance of the multi-code-set channel estimation is difficult to approach the performance of an ideal channel estimation because of the effect of the unwanted cross correlation among the channel estimation codes of various code-sets; on the other hand, it is complicated in calculation for better channel estimation performance and the cost of implementation is high.

SUMMARY OF THE INVENTION

The object of the invention is to provide a multi-code-set channel estimation method in a time-slot CDMA system so as to realize a multi-code-set joint channel estimation with improved performance and reduced cost in the case of existence of signals responding to channel estimation codes of multiple code-sets.

To this end, the technical solution below is provided according to the invention.

A multi-code-set channel estimation method in a time-slot CDMA system, comprising steps of: A. performing uni-code-set channel estimations with respect to signals corresponding respectively to a plurality of code-sets, and obtaining channel estimation results respectively of the plurality of code-sets; B. extracting a maximum interference tap from the channel estimation results; C. reproducing interference components suffered respectively by a response signal corresponding to each code-set from the maximum interference tap; D. canceling the interference components suffered respectively by the response signals corresponding respectively to each code-set from the maximum interference tap, and obtaining pure channel estimation results respectively of a signal corresponding to each code-set; E. determining whether a predetermined number of iterations has been performed, if so, outputting the pure channel estimation results respectively of the signal corresponding to each code-set; otherwise, taking the pure channel estimation results respectively of the signal corresponding to each code-set as the channel estimation results of the code-sets to be processed in the next iteration, and returning to step B.

A multi-code-set channel estimation method in a time-slot CDMA system comprises the following steps: A'. performing uni-code-set channel estimations with respect to signals corresponding respectively to a plurality of code-sets, obtaining channel estimation result corresponding respectively to the plurality of code-sets, and duplicating the channel estimation results respectively for each code-set, resulting in original channel estimation results and duplicate channel estimation results; B'. extracting a maximum interference tap from the original channel estimation results; C'. reproducing interference components suffered respectively by a response signal corresponding to each code-set from the maximum interference tap; D'. canceling, from the original channel estimation results and the duplicate channel estimation results respectively, the interference components suffered respectively by the response signal corresponding to each code-set from the maximum interference tap, thus obtaining pure channel estimation results respectively of a signal corresponding to each code-set, and setting the maximum interference tap as "0"; E'. determining whether a predetermined number of iterations has been performed, if so, outputting the pure channel estimation results respectively of the signal corresponding to each code-set; otherwise, taking the pure channel estimation results respectively of the signal corresponding to each code-set as the channel estimation results of the code-sets to be processed in the next iteration, and returning to step B'.

Each of step C and step C' may comprise the following steps: C1. obtaining mutual interference vectors between the channel estimation codes, wherein the mutual interference vectors may be generated by calculation in field or obtained by looking up a table; C2. based on the mutual interference vectors respectively of the channel estimation codes, calculating the interference components suffered respectively by the response signals corresponding respectively to each code-set from the maximum interference tap.

Optionally, the pure channel estimation result for the signal corresponding to each code-set is obtained by performing a complete cancellation or a partial cancellation with respect to the received signal. In the process of performing the partial cancellation with respect to the received signal to obtain the pure channel estimation result for the signal corresponding to each code-set, the canceled ratio may increase gradually with the number of iterations.

Optionally, when completing a predetermined number of iterations in step E, the channel estimation result for each code-set after the predetermined number of iterations may be directly taken as the pure channel estimation result for the signal corresponding to each code-set. Alternatively, the maximum interference taps respectively retained in each iteration constitute the pure channel estimation results respectively for the signal corresponding to each code-set.

Optionally, the mutual interference vector may be calculated specifically as follows:

$$CR_{i1}^{(m,m1)} = IDFT\left(\frac{DFT(g_{m1})DFT(I_{P,i1})}{DFT(g_m)}\right); m \neq m1$$

Where, $g_m = (g_1, g_2, \ldots, g_P)$ is a basic code of the $m^{th}$ code-set. $I_{P,i}$ is a column vector with a length of P, the $i^{th}$ element of $I_{P,i}$ is 1 and the other elements of $I_{P,i}$ are all 0. It is a point multiplication relation between the two "DFT"s in the numerator and it is a point division relation between the numerator and the denominator.

It can be seen from the technical solution provided above according to the invention, in the case of existence of signals responding respectively to channel estimation codes of multiple code-sets, the information provided by the multi-code-set signal is fully utilized by the invention, so that the main portion of the interference suffered by the signals of the plurality of code-sets from each other may be cancelled and the performance of the channel estimation may be improved. In the present invention, iterated operations of the interference reproduction and the interference cancellation are performed directly in the results of uni-code-set channel estimation. Consequently, the complexity of calculation is reduced greatly and a multi-code-set channel estimation of high performance may be realized with a reduced cost.

The present invention may be used to improve the performance of the uni-code-set channel estimation, and also may be used to simultaneously obtain the channel estimation results of a plurality of code-sets, thus assuring normal operation of adjacent cells with the same frequency in a time-slot CDMA system. This provides a base for channel and interference measurement in various technologies related to the application of intelligent antenna, the management of wireless resources, the physical layer measurement and the extension of the time-slot CDMA system.

DETAILED DESCRIPTION OF THE EMBODIMENTS

The basic idea of the invention is to extract a maximum interference tap from the result of each uni-code-set channel estimation, so as to reproduce directly the interference signals from other code-sets than the concerned code-set, and cancel the interference signals to obtain a pure signal response corresponding to each code-set. After the above procedures are repeated for the pure signal response corresponding to each code-set for a predetermined number of iterations, the channel estimation results are output.

The interference the midamble of the concerned cell suffers from a neighbor cell with the same frequency mainly comes from the response to the midamble signal of other code-sets synchronous with the concerned cell. In addition, in some other applications, it is also possible that the signals, with similar powers, responding to the midambles of multiple code-sets overlap with each other. In this situation, the received signal responding to the midamble is referred to as a signal responding to the multi-code-set channel estimation code, and abbreviated as a multi-code-set signal hereinafter for convenience of description. Because of the existence of the signals of the plurality of code-sets, it is not only possible to obtain channel estimations of a plurality of code-sets simultaneously, but also possible to improve the performance of the uni-code-set channel estimation.

According to the invention, the multi-code-set channel estimation in the prior art is optimized. Particularly, a maximum interference tap is extracted from the result of a uni-code-set channel estimation, and the iterations of the interference reproduction and the interference cancellation may be carried out directly, so that the multi-code-set channel estimation is implemented with high performance and reduced cost.

For making those skilled in the art understand the solution of the invention better, a flier detailed description of the invention will be given in conjunction with the accompanying drawings and embodiments.

Figure 1:
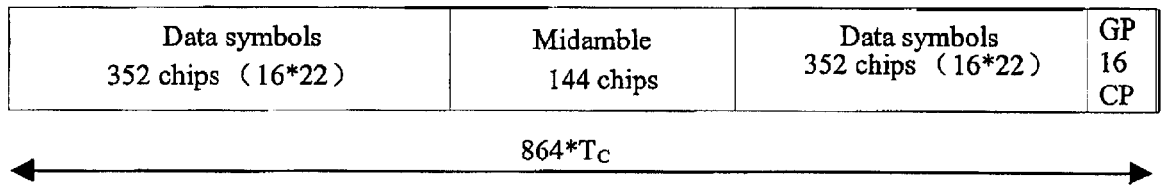
FIG. 1 is a schematic diagram illustrating an exemplary structure of a burst signal in a time slot of the TD-SCDMA service.
Figure 2:
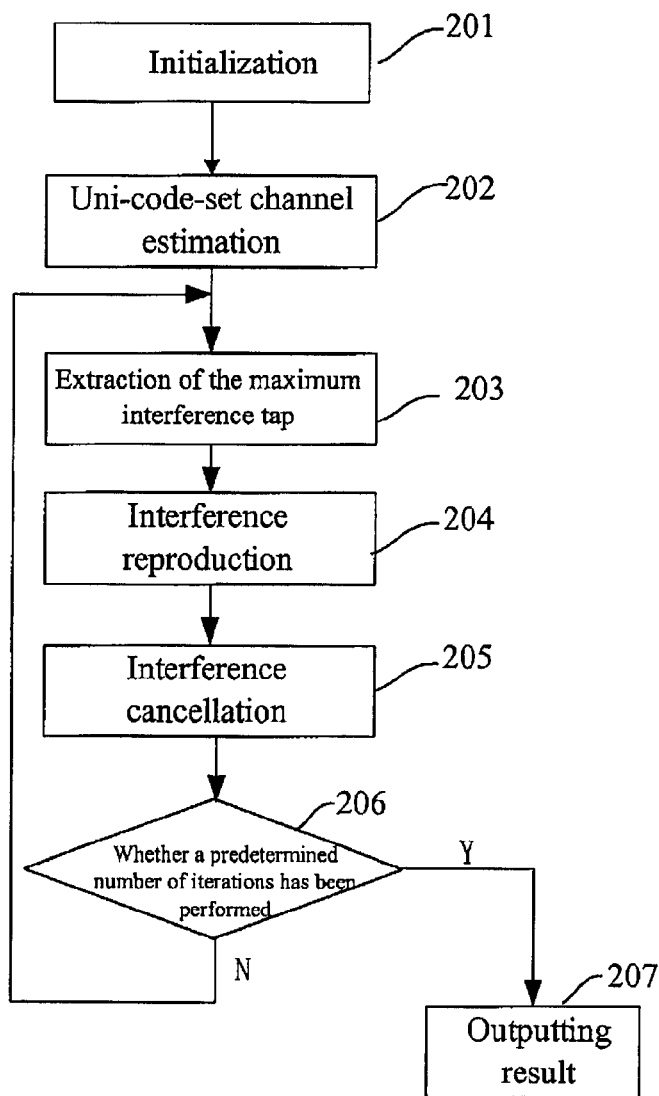
FIG. 2 is a flowchart of an exemplary implementation of a method according to an embodiment of the invention.

An exemplary flow for implementing the method according to one embodiment of the invention is shown in FIG. 2, comprising the following steps:

Step 201, initializing:

Before the channel estimation, since it is unable to separate received uni-code-set signals from received multi-code-set signal, the input of each uni-code-set channel estimator is set, before the channel estimation, to be equal to the total received multi-code-set signal.

Step 202, uni-code-set channel estimating:

By means of uni-code-set estimator, uni-code-set channel estimation is performed respectively for different code-sets to obtain original channel estimation results respectively for each code-set.

Step 203, extracting the maximum tap to be processed:

First, the tap with the maximum peak power among the channel estimation results for the code-sets is obtained, and the code-set m1 corresponding to the tap with the maximum peak power, the corresponding tap position i1 and the tap with the maximum power $h_{m1,i1}'$ are recorded.

Step 204, interference reproducing:

By using the tap with the maximum power, obtained above, among the channel estimation results respectively for each code-set, the interference components from the response signals corresponding respectively to each code-set are reproduced. That is, by using the maximum power tap $h_{m1,i1}'$ described above, the interferences that the channel estimation results respectively for each of the other code-sets suffer there from are calculated:

$$I_m = h_{m1,i1}' CR_{i1}^{(m,m1)}; m \neq m1 \qquad (8)$$

Where, $CR_{i1}^{(m,m1)}$ is a mutual interference vector that the channel estimation for the $m^{th}$ code-set suffers from a unit response, at the $i1^{th}$ tap, corresponding to the $m1^{th}$ code-set. The calculation equation is as follows:

$$CR_{i1}^{(m,m1)} = IDFT\left(\frac{DFT(g_{m1})DFT(I_{P,i1})}{DFT(g_m)}\right); m \neq m1$$

Where, $g_m = (g_1, g_2, \ldots, g_P)$ is a basic code of the $m^{th}$ code-set. $I_{P,i}$ is a column vector with a length of P, the $i^{th}$ element of $I_{P,i}$ is 1 and the other elements of $I_{P,i}$ are all 0. It is a point multiplication relation between the two "DFT"s in the numerator and it is a point division relation between the numerator and the denominator.

$CR_{i1}^{(m,m1)}$ may be calculated in field or be obtained by look up a table obtained by pre-calculation.

Step 205, interference canceling:

The reproduced interference components introduced by the responses to the signals of other code-sets are subtracted from the total received signal to obtain a cleaner signal for each code-set, i.e., the interferences obtained above are cancelled out from the channel estimation results:

$$h_m' = h_m' - I_m; m \neq m1 \qquad (9\text{-}1)$$

$$h_m' = h_{m1}'; m = m1 \qquad (9\text{-}2)$$

In the above processing of the interference cancellation, either a complete interference cancellation or a partial interference cancellation may be employed. When performing the partial interference cancellation, an interference component is multiplied by a coefficient which may be a fixed value or is gradually increased with the number of iterations.

Step 206, judging whether a predetermined number of iterations have been performed:

If yes, then the process passes to step 207 in which the results are output.

The result may be $h'_m$ which is obtained after cancellations of multiple iterations, wherein m is the number of cells. The results may also be the maximum power tap $h_{m1,i1}'$ selected respectively from each iteration in the step 203 and serving as channel estimation results respectively for each required cell.

If the predetermined number of iterations have not been completed, then the process returns to step 203 to continue the next iteration for the interference cancellation results obtained in step 205, i.e., for the respective cleaner signals, obtained by the last iteration, for each code-set.

According to an embodiment of the method of the invention, for the total of signals of the plurality of code-sets, in the situation where shifts exists between the signals of the plurality of code-sets, the signals of the plurality of code-sets may be processed in the following two schemes:

In one scheme, the signals of different code-sets are still regarded as signals which are strictly synchronous with each other, and the channel estimation, the interference reproduction and the interference cancellation are implemented by using the data sampled in the same sampling point. Only when the final channel estimation result is employed, is considered the shift of the correspondence between the channel estimation and the code channel which is caused by the time shift.

In another scheme, each signal is processed based on a respective synchronous time of the corresponding code set, and the channel estimation, the interference reproduction and the interference cancellation are performed based on different time shifts for different code-sets. In this way, what is cancelled is just the interference components coming from other code-sets than the concerned code-set and overlapping with each other in time field. In this case, the channel estimation results may be used directly.

In the implementation of the method of the invention, for the original channel estimation result, two duplicates may be stored. One of the duplicates is involved in selection of the maximum interference tap, the interference reproduction and the cancellation of the interference tap, and the maximum interference tap is set as 0 after the cancellation. However, the channel estimation result does not serve as the output after the predetermined number of iterations have been completed. The other duplicate is not involved in selection of the maximum interference tap and the interference reproduction, but only involved in the interference cancellation, and may be used as the output after the predetermined number of iterations have been completed.

Figure 3:
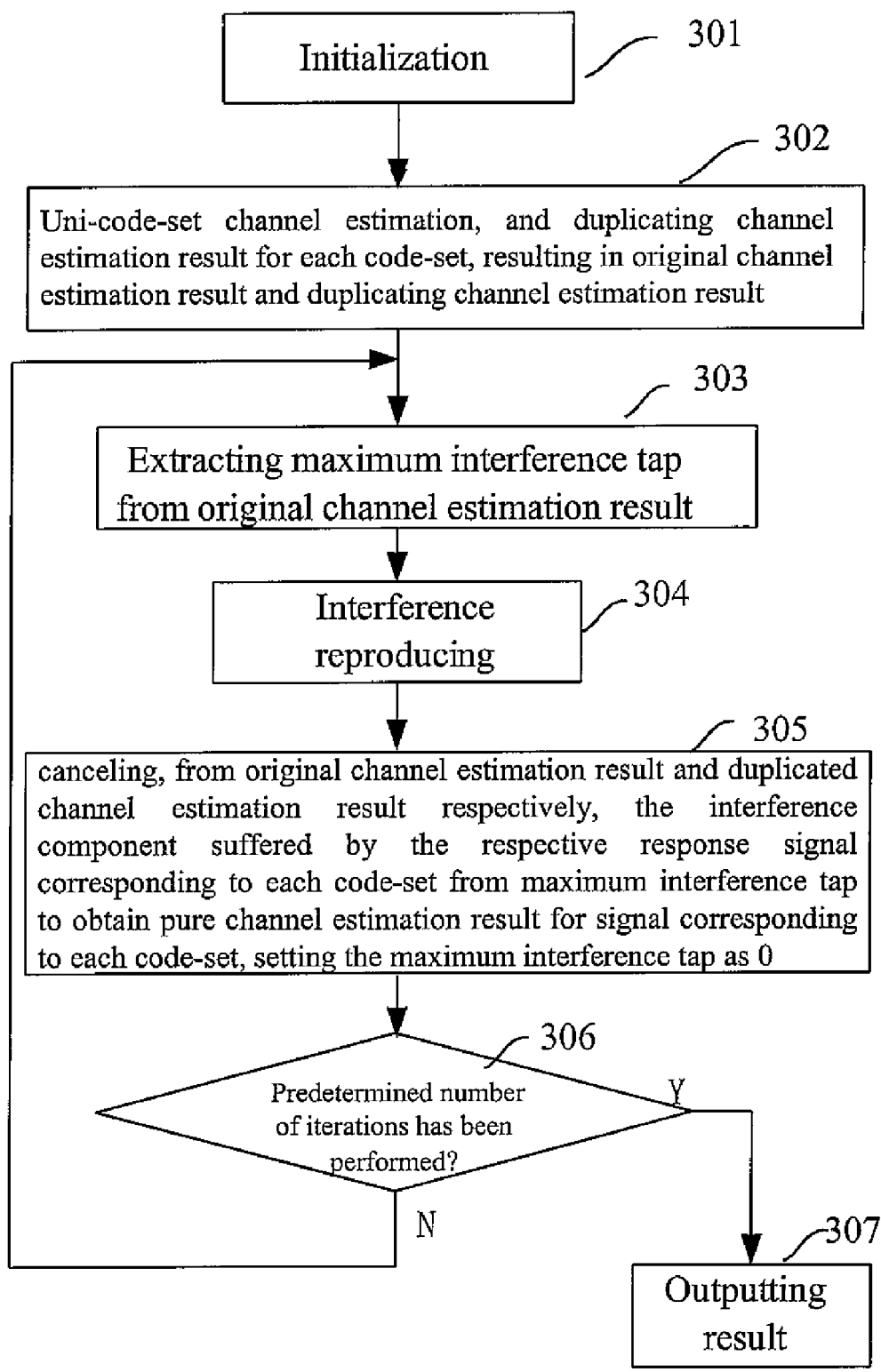
FIG. 3 is a flowchart of another exemplary implementation of the method according to an embodiment of the invention.

Referring to the exemplary flow illustrated in FIG. 3, another embodiment of the method of the invention includes the following steps:

Step 301, initializing:

Before the channel estimation, since it is unable to separate the received uni-code-set signals from the received multi-code-set signal, the input of each uni-code-set channel estimator is set, before the channel estimation, to be equal to the total received multi-code-set signal.

Step 302, uni-code-set channel estimating:

Performing uni-code-set channel estimation with respect to signals respectively of the plurality of code-sets, obtaining a channel estimation result of each code-set, and duplicating the channel estimation result for each code-set, resulting in an original channel estimation result and a duplicate channel estimation result.

Step 303, extracting a maximum interference tap from the original channel estimation results:

First, the tap with the maximum peak power among the channel estimation results for the code-sets is obtained, and the code-set m1 corresponding to the tap with the maximum peak power, the corresponding tap position i1 and the tap with the maximum power $h_{m1,i1}'$ are recorded.

Step 304, interference reproducing:

By using the tap with the maximum power, obtained above, among the channel estimation results respectively for each code-set, the interference components in the response to each code-set signal are reproduced, i.e., by using the maximum power tap $h_{m1,i1}'$ described above, the interference suffered by the respective channel estimation result for each of the other code-sets therefrom is calculated: $\underline{I}_m = h_{m1,i1}' CR_{i1}^{(m,m1)}$; m≠m1.

Step 305, canceling, from the original channel estimation results and the duplicate channel estimation results respectively, the interference components suffered respectively by the response signal corresponding to each code-set from the maximum interference tap, to obtain the pure channel estimation results respectively for the signal corresponding to each code-set and set the maximum interference tap as 0. i.e.:

$$h_m' = h_m' - \underline{I}_m; m \neq m1;$$

$$h_m' = h_m'; m = m1;$$

$$h_m'' = h_m'' - \underline{I}_m; m \neq m1;$$

$h_m'' = h_m''$; m=m1, but the $i1^{th}$ tap is set as 0, i.e., $h_{m1,i1}'' = 0$.

Similarly, in the above interference cancellation, either a complete interference cancellation mode or a partial interference cancellation mode may be employed.

Step 306, judging whether a predetermined number of iterations have been performed:

If yes, then the process passes to step 307 in which the results are output.

The result may be $h'_m$ which is obtained after cancellations of multiple iterations, wherein m is the number of cells. The result may also be the maximum power tap $h_{m1,i1}'$ selected from each iteration in the step 303 and serving as respective channel estimation results for each required cell.

If the predetermined number of iterations has not been completed, then the process returns to step 303 to continue the next iteration for the interference cancellation results obtained in step 305, i.e., for the respective cleaner signals, obtained by the last iteration, for each code-set.

The channel estimation method will be described in detail below taking the situation where there are received signals corresponding to three different code-sets as an example.

Supposing that in the signals of the plurality of code-sets received by a receiver at a position where the three cells intersects with each other, the responses to the midamble signals of the three code-sets belonging to the three cells are the strongest. The cyclic matrixes corresponding to the three code-sets are G1, G2 and G3 respectively, and the channel response vectors are h1, h2 and h3 respectively. Then, the received signal may be expressed as follows:

$$e_{mid} = \sum_{m=1}^{3} G_m h_m + n_0 \qquad (10)$$

Where, $n_0$ is different from n in formula (3) and represents all the other noises except the three signals of the plurality of code-sets.

The values of the number of iterations and the number of code-sets are determined by considering the overhead of the algorithm and the results of simulations and actual experiments. In this example, the number of iteration is set as 6.

The specific implementing steps are as follows:

Step 1, initializing: before the channel estimation, supposing the input of each of uni-code-set channel estimator is equal to the total of received multi-code-set signals.

$$e_{mid,m} = e_{mid}, m=1, 2, 3 \qquad (11)$$

Step 2, uni-code-set channel estimating: by using a uni-code-set estimation method, performing uni-code-set channel estimations respectively for each code-set to obtain according to formula (6), the original channel estimation results $\hat{h}_m$ respectively for each code-set:

$$\hat{h}_m = G_m^{-1} e_{mid} \qquad (12)$$

In accordance with formula (7), through FFT, the formula (12) may be expressed as follows:

$$\hat{h}_m = IDFT\left(\frac{DFT(e_{mid})}{DFT(g_m)}\right), m = 1,2,3 \qquad (13)$$

Where, $g_m = (g_1, g_2, \ldots, g_P)$ is a basic code of the $m^{th}$ (m=1, 2, 3) code-set.

Let $h_m' = \hat{h}_m$, m=1, 2, 3

Step 3, obtaining the maximum peak value:

The tap with the maximum peak power in the original channel estimation results of the above three code-sets is obtained through an sorting method, and the code-set containing the tap with the maximum peak power is expressed as m1, the corresponding tap position as i1 and the tap with the maximum power as $h_{m1,i1}'$.

Step 4, interference reproducing:

For the first code-set m1, substituting formula (10) into formula (12):

$$\hat{h}_1 = G_1^{-1} e_{mid} = G_1^{-1}(G_1 h_1 + G_2 h_2 + G_3 h_3 + n_0) = h_1 + G_1^{-1} G_2 h_2 + G_1^{-1} G_3 h_3 + G_1^{-1} n_0 \qquad (15)$$

Through 2-Dimension Fourier Transform (DFT) and 2-Dimension Inverse Fourier Transform (IDFT), resulting in:

$$\hat{h}_1 = h_1 + IDFT\left(\frac{DFT(g_2)DFT(h_2)}{DFT(g_1)}\right) + IDFT\left(\frac{DFT(g_3)DFT(h_3)}{DFT(g_1)}\right) + \qquad (16)$$
$$IDFT\left(\frac{DFT(n_0)}{DFT(g_1)}\right)$$
$$= h_1 + \sum_{i=1}^{P} h_{2,i}\left(IDFT\left(\frac{DFT(g_2)DFT(I_{P,i})}{DFT(g_1)}\right)\right) +$$
$$\sum_{i=1}^{P} h_{3,i}\left(IDFT\left(\frac{DFT(g_3)DFT(I_{P,i})}{DFT(g_1)}\right)\right) + IDFT\left(\frac{DFT(n_0)}{DFT(g_1)}\right)$$

Where, $h_{2,i}$ is the $i^{th}$ tap of the total channel response for the second code-set; $h_{3,i}$ is the $i^{th}$ tap of the total channel response for the third code-set;

$I_{P,i}$ is a column vector with a length of P (P=128) in which the $i^{th}$ element is 1 and the other elements are all 0. It is a point multiplication relation between "DFT"s in the numerator.

It is supposed that $CR_i^{(m1,m2)}$ is a vector of mutual interference which the channel estimation of the m1$^{th}$ code-set suffered from the unit response at the $i^{th}$ tap corresponding to the m2$^{th}$ code-set. $CR_i^{(m1,m2)}$ may be calculated in field or be obtained by look up a table obtained by pre-calculation.

$$CR_i^{(m1,m2)} = IDFT\left(\frac{DFT(g_{m2})DFT(I_{P,i})}{DFT(g_{m1})}\right),$$

then formula (15) becomes:

$$\hat{h}_1 = h_1 + \sum_{i=1}^{P} h_{2,i} CR_i^{(1,2)} + \sum_{i=1}^{P} h_{3,i} CR_i^{(1,3)} + IDFT\left(\frac{DFT(n_0)}{DFT(g_1)}\right) \qquad (17\text{-}1)$$

Similarly, the following can be obtained:

$$\hat{h}_2 = h_2 + \sum_{i=1}^{P} h_{1,i} CR_i^{(2,1)} + \sum_{i=1}^{P} h_{3,i} CR_i^{(2,3)} + IDFT\left(\frac{DFT(n_0)}{DFT(g_2)}\right) \qquad (17\text{-}2)$$

$$\hat{h}_3 = h_3 + \sum_{i=1}^{P} h_{1,i} CR_i^{(3,1)} + \sum_{i=1}^{P} h_{2,i} CR_i^{(3,2)} + IDFT\left(\frac{DFT(n_0)}{DFT(g_3)}\right) \qquad (17\text{-}3)$$

The interference suffered by the channel estimation result of each other code-set from the maximum power tap $h_{m1,i1}'$ is calculated by using the maximum power tap $h_{m1,i1}'$ obtained above:

$$I_m = h_{m1,i1}' CR_{i1}^{(m,m1)}; m \neq m1 \qquad (18)$$

Step 5, interference canceling:

The interferences described above are cancelled from the channel estimation results:

$$h_m' = h_m' - I_m; m \neq m1$$

$$h_m' = h_m'; m = m1$$

After the interferences are cancelled, decrementing the number of iterations, and then determining whether the number of iterations has reached 6;

If the number of iterations is reached, stopping the iteration and outputting the channel estimation results.

If the number of iterations is not reached, return to step 3.

The channel estimation results may be $h_m'$, m=1, 2, 3, which are obtained after cancellations in multiple iterations;

The channel estimation result of each cell to be output may also be made up of $h_{m1,i1}'$ selected from each iteration. For clear representation of the output format, it is supposed that from the channel estimation results of the three code-sets, two maximum power taps are selected respectively in two iterations, i.e., the first and second taps $h_{1,1}', h_{1,2}'$ corresponding to the first code-set, the first and second taps $h_{2,1}', h_{2,2}'$ corresponding to the second code-set, and the first and second taps $h_{3,1}', h_{3,2}'$ corresponding to the third code-set, $h_1'=(h_{1,1}',h_{1,2}',0\ldots,0)$, where the number of "0" is P−2;

$h_2'=(h_{2,1}',h_{2,2}',0\ldots,0)$, where the number of "0" is P−2;

$h_3'=(h_{3,1}',h_{3,2}',0\ldots,0)$, the number of "0" is P−2;

Where, P is the period of the basic code, P=128.

In step 2 (uni-code-set channel estimating) of the above process, only one duplicate of $h_m'$, m=1, 2, 3 is involved in the subsequent steps.

In practice, it is also possible to store two duplicates of $h_m'$, m=1, 2, 3: one duplicate is involved in the selection of the maximum interference tap in step 3 and the interference tap cancellation in step 5, and the maximum tap is set as 0 after the cancellation. The duplicate does not serve as the output after the number of the iterations is reached. The other duplicate is not involved in selection of the maximum interference tap in step 3, but only involved in the interference cancellation in step 5, and may be used as the output after the number of the iterations is reached.

The specific flow is as follows:

Step 1', initializing: before the channel estimation, supposing the input of each uni-code-set channel estimator is equal to the total of received multi-code-set signals, $e_{mid,m} = e_{mid}$, m=1, 2, 3

Step 2', uni-code-set channel estimating:

Similar to the step 2 mentioned above, $h_m'=\hat{h}_m$, m=1, 2, 3 and $h_m''=\hat{h}_m$, m=1, 2, 3 are obtained, where, $h_m'$ is only involved in the interference cancellation process, and $h_m''$ is involved in the maximum tap extraction and the interference reproducing process.

Step 3', obtaining the maximum peak value:

Through sorting, the tap with the maximum peak power in $h_m''$, m=1, 2, 3 is obtained, and the code-set containing the tap with the maximum peak power is recorded as m1, the corresponding tap position as i1 and the tap with the maximum power as $h_{m1,i1}'$.

Step 4', interference reproducing:

Similar to above, $\underline{I}_m = h_{m1,i1}'' CR_{i1}^{(m,m1)}$, m≠m1 can be obtained.

Step 5', interference canceling:

$h_m' = h_m' - \underline{I}_m$; m≠m1

$h_m' = h_m'$; m=m1

$h_m'' = h_m'' - \underline{I}_m$; m≠m1

$h_m'' = h_m''$; m=m1 but the $i1^{th}$ tap is set as 0, i.e., $h_{m1,i1}''=0$;

After the interference is cancelled, decrementing the number of iterations and then determining whether the number of iterations is reached. If yes, stop the iteration and output the channel estimation result; otherwise return to step 3'.

The result may be $h_m'$, m=1, 2, 3 experienced cancellations in multiple iterations;

And $h_{m1,i1}''$, selected from each iteration, may also be stored to consist of the channel estimation result of each cell to be output.

For a clear representation of the output format, it is supposed that for each of the channel estimation results of the three code-sets, two maximum power taps are selected respectively in two iterations, i.e., the first and second taps $h_{1,1}''$, $h_{1,2}''$ corresponding to the first code-set, the first and second taps $h_{2,1}''$, $h_{2,2}''$ corresponding to the second code-set, and the first and second taps $h_{3,1}''$, $h_{3,2}''$ corresponding to the third code-set, then:

$h_1'=(h_{1,1}'',h_{1,2}'',0\ldots,0)$, where the number of "0" is P−2;

$h_2'=(h_{2,1}'',h_{2,2}'',0\ldots,0)$, where the number of "0" is P−2;

$h'_3=(h_{3,1}'',h_{3,2}'',0\ldots,0)$, where the number of "0" is P−2;

Where, P is the period of the basic code, P=128.

Figure 4:
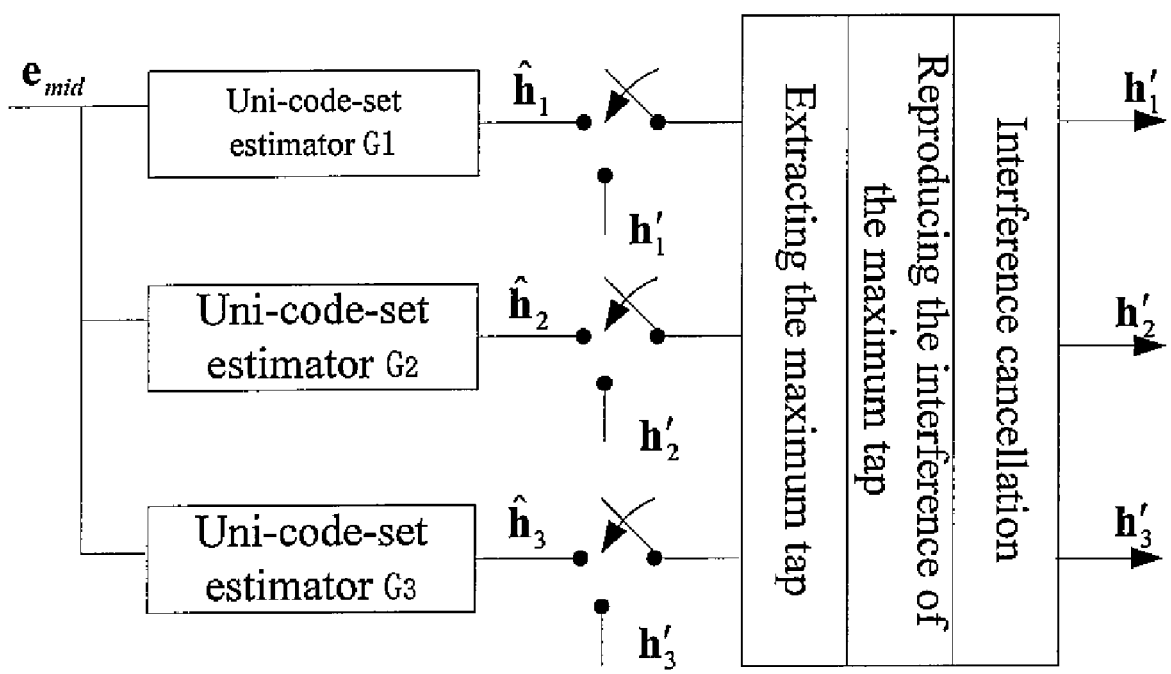
FIG. 4 is an exemplary schematic diagram illustrating the signal processing for the multi-code-set channel estimation according to an embodiment of the invention.

The procedure for signal processing in the above embodiment is shown in FIG. 4:

In the drawing, when initializing, the total of received signals $e_{mid}$ is input into each uni-code-set estimator to obtain the original channel estimation result $\hat{h}_m$ of each code-set. The result is subject to processes of the maximum tap selection, the maximum tap interference reproduction and the interference cancellation and a pure signal response $h_m'$ is obtained for each code-set. After that, the pure signal response corresponding to each code-set is taken as the channel estimation result of the code-set, and the processes of the maximum tap selection, the maximum tap interference reproduction and the interference cancellation are repeated until a predetermined number of iterations is reached. Depending on actual requirements, the result obtained after cancellations in multiple iterations is taken as the channel estimation result of each code-set, or the maximum power tap selected in each iteration is used to construct the channel estimation result of each cell.

It could be seen that that, according to the method of multi-code-set channel estimation of the invention. The iterations of the interference reproduction and interference cancellation are performed directly in the channel estimation results, therefore, the iteration process may be implemented with greatly reduced complexity and the multi-code-set channel estimation may be realized with high performance and reduced cost.

Although the invention has been described with reference to embodiments, those skilled in the art will appreciate that various changes and modifications may occur to the present invention without departing from the spirit and scope thereof. Thus, the appended claims are intended to include these changes and modifications without departing from the spirit of the invention.

What is claimed is:

1. A multi-code-set channel estimation method in a time-slot CDMA system, comprising steps of:
   A. performing uni-code-set channel estimations with respect to signals corresponding respectively to a plurality of code-sets, and obtaining channel estimation results respectively of the plurality of code-sets;
   B. extracting a maximum interference tap from the channel estimation results;
   C. reproducing interference components suffered respectively by response signals corresponding respectively to the plurality of code-sets from the maximum interference tap;
   D. canceling the interference components suffered respectively by response signals corresponding respectively to the plurality of code-sets from the maximum interference tap, and obtaining pure channel estimation results of respective code-set signals;
   E. determining whether a predetermined number of iterations has been performed, if so, outputting the pure channel estimation results of respective code-set signals; otherwise, taking the pure channel estimation results of respective code-set signals as the channel estimation results of respective code-sets to be processed in the next iteration, and returning to step B.

2. The method according to claim 1, wherein Step C further comprises:
C1. obtaining mutual interference vectors between the channel estimation codes respectively of the plurality of code-sets;
C2. calculating the interference components suffered respectively by response signals corresponding respectively to the plurality of code-sets from the maximum interference tap based on the mutual interference vectors between the channel estimation codes.

3. The method according to claim 2, wherein step C1 comprises: generating the mutual interference vectors between the channel estimation codes through calculation in field; or obtaining the mutual interference vectors between the channel estimation codes through searching a table.

4. The method according to claim 2, wherein the mutual interference vectors are calculated specifically as follows:

$$CR_{i1}^{(m,m1)} = IDFT\left(\frac{DFT(g_{m1})DFT(I_{P,i1})}{DFT(g_m)}\right); m \neq m1$$

Where, $g_m = (g_1, g_2, \ldots, g_P)$ is a basic code of the $m^{th}$ code-set. $I_{P,i}$ is a column vector with a length of P, the $i^{th}$ element of $I_{P,i}$ is 1 and the other elements of $I_{P,i}$ are all 0, it is a point multiplication relation between the two "DFT"s in the numerator and it is a point division relation between the numerator and the denominator.

5. The method according to claim 1, wherein step D comprises:
performing a complete cancellation with respect to the received signal to obtain the pure channel estimation results of respective code-set signals.

6. The method according to claim 1, wherein step D particularly comprises:
performing a partial cancellation with respect to the received signal to obtain the pure channel estimation results of respective code-set signals.

7. The method according to claim 6, wherein, in the process of performing a partial cancellation with respect to the received signal to obtain the pure channel estimation results for respective code-set signals, the canceled ratio is a fixed value or increases gradually with the number of iterations.

8. The method according to claim 1, wherein, when the predetermined number of iterations is reached in the step E, the channel estimation results for respective code-sets after the predetermined number of iterations are directly taken as the pure channel estimation results for respective code-set signals.

9. The method according to claim 1, wherein, when the predetermined number of iterations is reached in the step E, the maximum interference taps respectively retained in the iterations constitute respectively the pure channel estimation results for respective code-set signals.

10. The method according to claim 1, wherein, for the total of signals of the plurality of code-sets, in the situation where shifts exists among the signals of the plurality of code-sets, the processing of the signals of the plurality of code-sets comprises:
regarding the signals of different code-sets are signals which are strictly synchronous with each other, and implementing the channel estimation, the interference reproduction and the interference cancellation by using data sampled in the same sampling points; when the final channel estimation results are employed, talking into account the shift of the correspondence between the channel estimation and the code channel due to the time shift; or
processing each signal based a respective synchronous time of the corresponding code set, and performing the channel estimation, the interference reproduction and the interference cancellation based on different time shifts for different code-sets.

11. A multi-code-set channel estimation method in a time-slot CDMA system, comprising:
A'. performing uni-code-set channel estimations with respect to signals corresponding respectively to a plurality of code-sets, obtaining channel estimation results respectively of the plurality of code-sets, and duplicating the channel estimation results for respective code-sets, resulting in original channel estimation results and duplicate channel estimation results;
B'. extracting a maximum interference tap from the original channel estimation results;
C'. reproducing interference components suffered by respective response signals corresponding to respective code-sets from the maximum interference tap;
D'. canceling, from the original channel estimation results and the duplicate channel estimation results respectively, the interference components suffered by the respective response signals corresponding to respective code-sets from the maximum interference tap, thus obtaining pure channel estimation results of respective code-set signals, and setting the maximum interference tap in the original channel estimation results as "0";
E'. determining whether a predetermined number of iterations has been performed, if so, outputting the pure channel estimation results of respective signals of respective code-sets; otherwise, taking the pure channel estimation results of respective signals of respective code-sets as the channel estimation results of the code-sets to be processed in the next iteration, and returning to step B'.

12. The method according to claim 11, wherein step C' comprising:
C'1. obtaining mutual interference vectors between the channel estimation codes of respective code-sets,
C'2. based on the mutual interference vectors between the channel estimation codes, calculating the interference components suffered by respective response signals corresponding to respective code-sets from the maximum interference tap.

13. The method according to claim 12, wherein step C'1 comprises: generating the mutual interference vectors between the channel estimation codes by calculation in field, or obtaining the mutual interference vectors between the channel estimation codes by looking up a table.

14. The method according to claim 13, wherein the step D' comprises:
obtaining the pure channel estimation results for respective signals of respective code-sets by performing a complete cancellation or a partial cancellation with respect to the received signal.

15. The method according to claim 14, wherein, in the process of obtaining the pure channel estimation results for respective signals of respective code-sets by performing the partial cancellation with respect to the received signal, the canceled ratio is increased gradually with the number of iterations.

* * * * *